United States Patent
Mohebbi et al.

(10) Patent No.: US 8,224,612 B2
(45) Date of Patent: Jul. 17, 2012

(54) SELF-TESTING DEVICE COMPONENT

(75) Inventors: Kouroush Mohebbi, Carmel, IN (US); Brian David Baehl, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 326 days.

(21) Appl. No.: 12/448,286

(22) PCT Filed: Dec. 18, 2006

(86) PCT No.: PCT/US2006/048004
§ 371 (c)(1),
(2), (4) Date: Jun. 16, 2009

(87) PCT Pub. No.: WO2008/076100
PCT Pub. Date: Jun. 26, 2008

(65) Prior Publication Data
US 2009/0281757 A1  Nov. 12, 2009

(51) Int. Cl.
*G01R 27/28* (2006.01)
(52) U.S. Cl. .................................... 702/117
(58) Field of Classification Search ............ 702/117, 702/118, 120
See application file for complete search history.

(56) References Cited

U.S. PATENT DOCUMENTS

| 427,546 | A | 6/1981 | Schmidt |
| 462,844 | A | 12/1986 | Rickard et al. |
| 2001/0018737 | A1* | 8/2001 | Redford et al. ............... 713/2 |
| 2001/0023492 | A1 | 9/2001 | Cheng et al. |
| 2002/0104051 | A1 | 8/2002 | Gupta |
| 2002/0147989 | A1* | 10/2002 | Kessler ..................... 725/134 |
| 2004/0252421 | A1* | 12/2004 | Knox et al. ................. 361/23 |
| 2005/0270015 | A1* | 12/2005 | Hemminger et al. ........ 324/142 |

FOREIGN PATENT DOCUMENTS

| DE | 3432580 | 3/1986 |
| DE | 4124708 | 1/1993 |
| DE | 4124708 A1 * | 1/1993 |
| EP | 0407036 | 1/1991 |
| EP | 1382974 | 1/2004 |
| GB | 2249204 | 4/1992 |
| JP | 62281034 | 12/1987 |
| WO | WO0070796 | 11/2000 |

OTHER PUBLICATIONS

International Search Report, dated May 25, 2007.

* cited by examiner

*Primary Examiner* — Michael Nghiem
*Assistant Examiner* — Manuel Rivera Vargas
(74) *Attorney, Agent, or Firm* — Robert D. Shedd; Harvey D. Fried; Richard LaPeruta

(57) ABSTRACT

A device has a microcontroller (102) configured to operate in a fully-assembled mode if a device component (100) of the device is connected to a primary portion of the device when power is applied to the device component and configured to operate in a self-test mode if the device component is not connected to the primary portion of the device when power is applied to the device component.

18 Claims, 3 Drawing Sheets

SELF-TESTING DEVICE COMPONENT

This application claims the benefit, under 35 U.S.C. §365 of International Application PCT/US2006/048004 filed Dec. 18, 2006, which was published in accordance with PCT Article 21(2) on Jun. 26, 2008 in English.

FIELD OF THE INVENTION

The invention relates generally to devices having a microcontroller. In particular, the invention relates to testing devices having a microcontroller.

BACKGROUND OF THE INVENTION

It is well known that electronic devices are becoming more sophisticated. For example, it is common for an electronic device to comprise several component parts. Some component parts now comprise a microcontroller independent of a so-called main processor of the device. The microcontrollers are often configured to control and/or communicate with other sub-components carried by the component parts. Set-top boxes in particular, have recently become more sophisticated.

Set-top boxes and integrated receiver descramblers (IRDs) are well known. However, as set-top boxes, and IRDs in general, become more complex and offer users more functionality, new problems arise. Not long ago, many set-top boxes had only six or seven light emitting diodes (LEDs) for indicating the operating status of the set-top box to the user. Recently, set-top boxes have been developed which include eighteen LEDs. The LEDs are typically located on a front panel assembly of the set-top box so that a user of the set-top box may see the lighted or unlighted state of each LED from a distance. In addition to the increased number of LEDs, the number of pushbuttons on the front panel has recently increased. Some recently developed set-top boxes include twelve pushbuttons for use in controlling the set-top boxes. While the increased number of LEDs and pushbuttons is normally beneficial to the user of the set-top box, the increased number of components increases the likelihood that one of the LEDs and pushbuttons will be defective. In the past, complicated and expensive testing approaches were implemented which required costly equipment and unduly laborious setup procedures. Clearly, the overall cost of testing a more complicated and component rich set-top box front panel assembly with a greatly increased number of LEDs and pushbuttons would be undesirable and too time consuming if tested using previous methods. Further, many set-top boxes and IRDs include infrared receivers, crystal oscillators, inter-integrated circuits ($I^2Cs$), and firmware on their front panel assemblies, which also need to be tested after manufacturing of the front panel assemblies but before assembly with the primary portion of the set-top boxes and before distribution of the set-top boxes to end-users.

It is therefore desirable to develop an improved system and method of testing set-top box front panel assemblies.

SUMMARY OF THE INVENTION

A set-top box has a front panel assembly having a microcontroller configured to operate in a fully-assembled mode if the front panel assembly is connected to a main processor of the set-top box when power is applied to the front panel assembly and configured to operate in a self-test mode if the front panel assembly is not connected to the main processor of the set-top box when external power is applied to the front panel assembly.

DETAILED DESCRIPTION OF THE INVENTION

Figure 1:
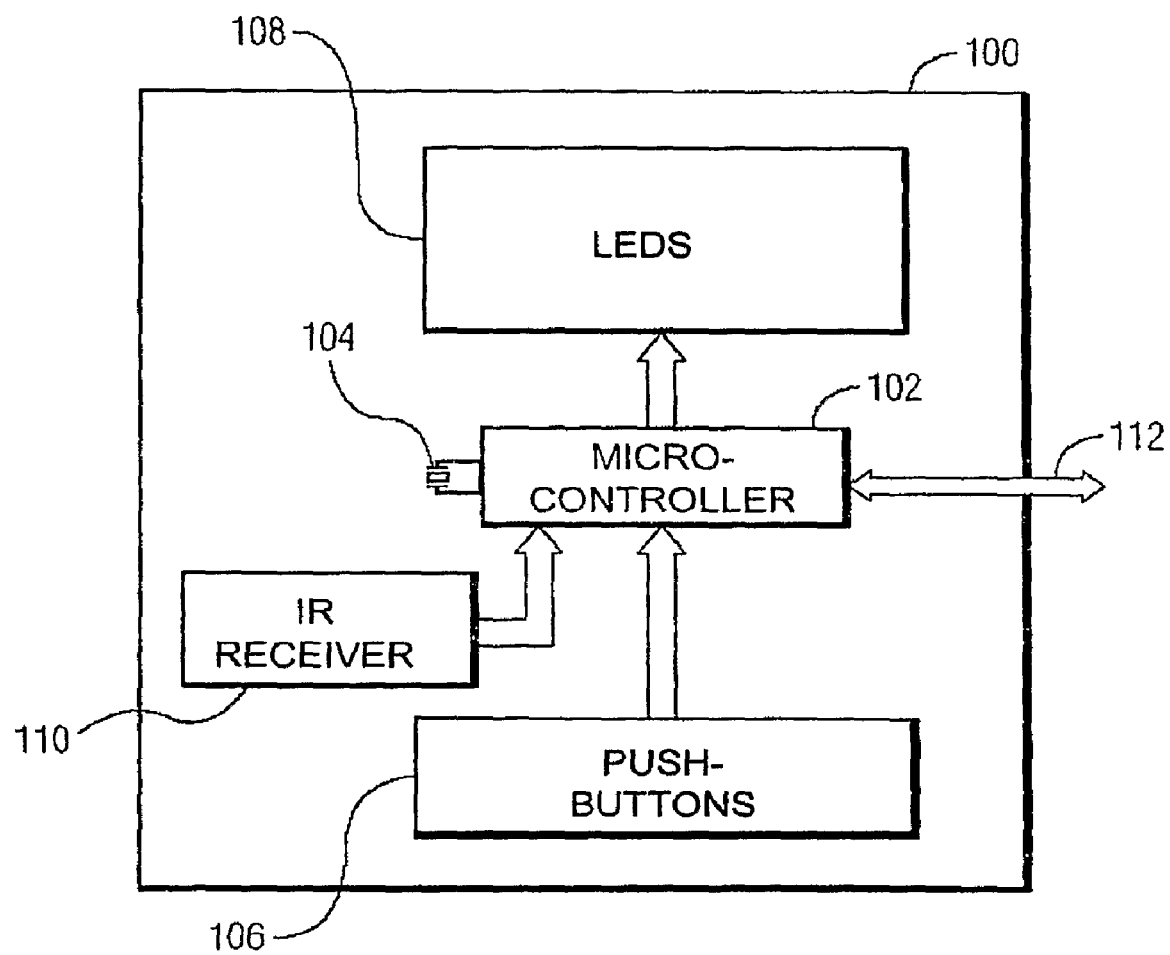
FIG. 1 is a schematic illustration of a front panel assembly according to an embodiment of the present invention.

Referring to FIG. 1 in the drawings, a front panel assembly according to an embodiment of the present invention is illustrated. Front panel assembly 100 (a "device component") is configured for two modes of operation. A first mode of operation, a fully-assembled mode, is the mode in which the front panel assembly 100 operates when properly connected to the primary portion of a set-top box (a "device" of which the "device component" is a component part) that is adapted to receive and operate in conjunction with the front panel assembly 100. (The primary portion of a device typically comprises a "main processor".) A second mode of operation, a self-test mode, is the mode in which the front panel assembly 100 operates when the front panel assembly is not connected to a set-top box, but rather, when the front panel assembly 100 is connected to a power source. While not shown in the drawings, the front panel assembly 100 comprises electronic logic componentry for determining when the front panel assembly 100 is connected/disconnected from a set-top box and for determining when the front panel assembly 100 is connected/disconnected from a power source. When the front panel assembly 100 is both disconnected from a set-top box and connected to a power source, the electronic logic causes the front panel assembly 100 to power-up and operate in the self-test mode. The electronic logic circuits may comprise pull-down and/or pull-up resistors and/or other known electronic componentry suitable for causing the front panel assembly 100 to switch between the fully-assembled mode and the self-test mode. Where a pull-up resistor is used, a microcontroller 102 (discussed infra) will read an associated input port to determine if the status of the port is high or low. If the status of the input port is in a high state, the front panel assembly 100 will go into the self-test mode. If the status of the input port is in a low state, the front panel assembly 100 will go into the fully-assembled mode. It will be appreciated that in alternative embodiments of the present invention, the "device component" (for example, front panel assembly 100) could be a "device component" (or component part) comprising a microcontroller of any "device".

Further, it will be appreciated that the front panel assembly 100 may be caused to enter the self-test mode by a manufacturer of the front panel assembly 100 or by a common home user of the front panel assembly 100. More specifically, the front panel assembly may be tested in self-test mode prior to distribution of the front panel assembly 100 to a home user and then later tested by a home user to diagnose suspected malfunctions (identified by the home user) of the front panel assembly 100. In the case where a home user is to cause the front panel assembly 100 to enter the self-test mode, the home user must electrically disconnect the front panel assembly 100 from the primary portion of a set-top box (either by physically separating them or through means of a disconnect switch or the like). In addition to disconnecting the front panel assembly from the primary portion of the set-top box, the home user must also apply power to the front panel assembly 100 to cause the front panel assembly 100 to enter the self-test mode.

Generally, the front panel assembly 100 comprises a microcontroller 102, a crystal oscillator 104 (external from the microcontroller 102), a plurality of pushbuttons 106, a plurality of light emitting diodes 108, an infrared receiver 110, and an electrical connection interface 112. The microcontroller 102 generally comprises (like most common microcontrollers) a central processing unit, an input/output interface, an internal counter, RAM for temporary data storage, and memory (ROM, EPROM, EEPROM or Flash) for software program storage. The input/output interface of the microcontroller 102 comprises an inter-integrated circuit ($I^2C$) capable of communicating with a main processor of a main embedded board of the primary portion of the set-top box to which the front panel assembly 100 is intended to interface. However, in alternative embodiments of the present invention, the inter-integrated circuit may be carried external from the microcontroller and merely be in communication with the microcontroller and likewise in communication with the main processor of the primary portion of the set-top box when connected to the primary portion of the set-top box. The microcontroller memory is operable to receive and store all necessary software instructions for performing a series of self-test actions (described infra). Of course, if the microcontroller memory is of the EPROM, EEPROM, Flash, or other erasable/updatable type, the software instructions stored in the microcontroller 102 memory may be altered or replaced as needed. The software instructions stored in the microcontroller 102 memory are generally referred to as firmware. It is well known that firmware is often cataloged/tracked by sequential numbering schemes that assign a particular release/version of firmware an identifying number or value. It is also well known that the integrity of software instructions such as firmware may be verified by performing a checksum of the firmware memory space. Since the above listed microcontroller 102 components are well known, they are not represented in the drawings. However, it will be appreciated that alternative embodiments of the present invention may comprise a microcontroller comprising fewer than all the components listed above or components in addition to the components listed above while remaining within the scope of the present invention. Finally, the electrical connection interface 112 is formed as a ribbon cable. The electrical connection interface 112 is well suited for connecting the front panel assembly 100 to any necessary power supplies, to the primary portion of the set-top box in a manner which allows communication and power sharing between the primary portion of the set-top box and the front panel assembly 100 as needed, and to other front panel assemblies (as discussed infra). Of course, in alternative embodiments of the present invention, the electrical connection interface may be formed as any other suitable set of electrical conductors/connectors.

Figure 2:
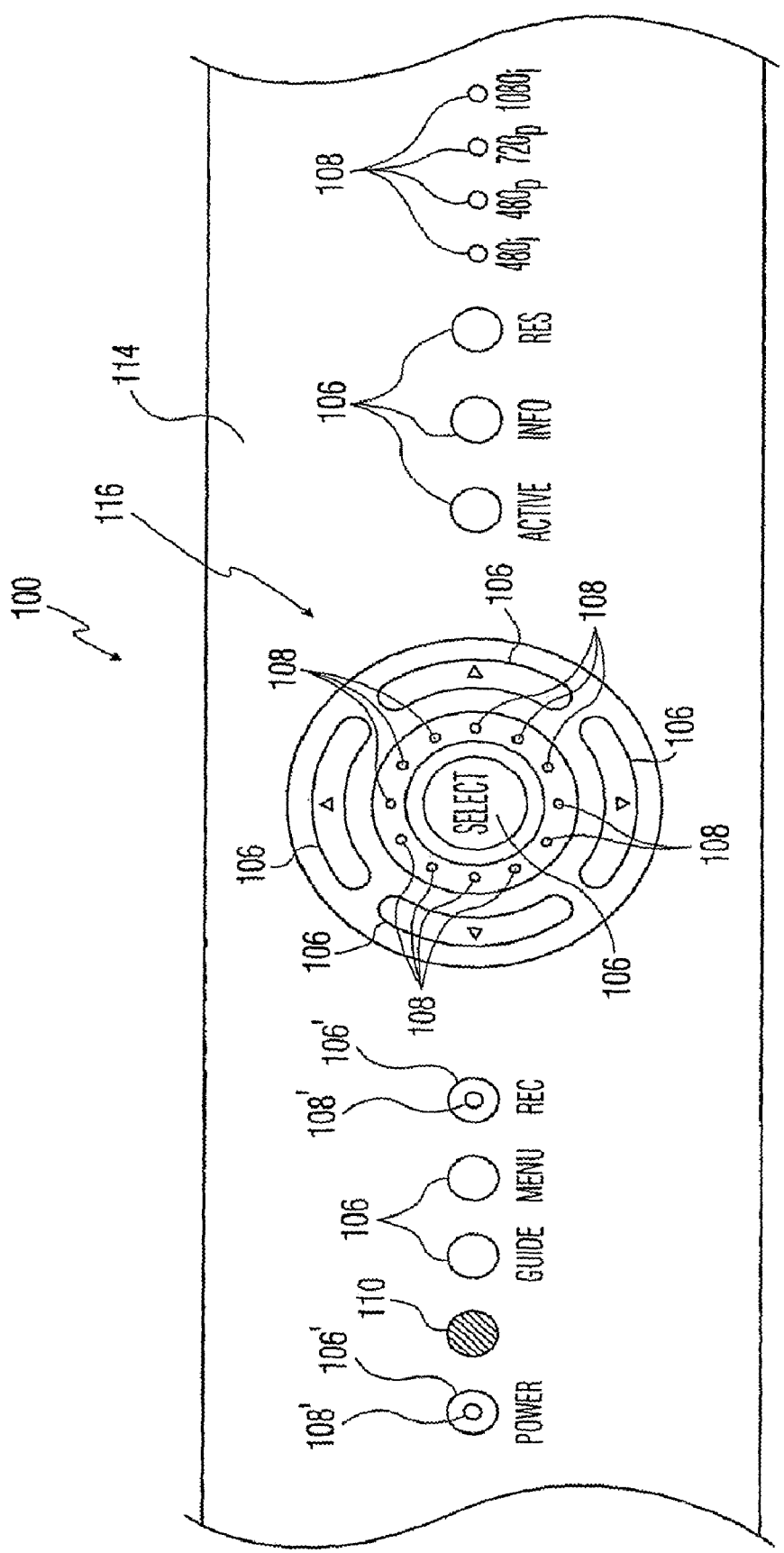
FIG. 2 is a front view of a portion of the front panel assembly of FIG. 1.

As noted above, front panel assembly 100 also comprises a crystal oscillator 104 (external from the microcontroller 102), a plurality of pushbuttons 106, a plurality of LEDs 108, an infrared receiver 110, and an electrical connection interface 112. Crystal oscillators are generally well known and the crystal oscillator 104 is included in the front panel assembly 100 to cooperate with the microcontroller 102 such that the internal oscillation of the microcontroller 102 is related to the oscillation of the crystal oscillator 104. It will be appreciated that in alternative embodiments, a microcontroller may comprise an internal oscillator (or resonator) and oscillate solely in response to an oscillator (or resonator) internal to the microcontroller. As shown in FIG. 2, the plurality of pushbuttons 106 and LEDs 108 are carried on an exterior surface 114 of the front panel assembly 100, in a manner so that they are accessible and visible, respectively, during use of the front panel assembly 100 when the front panel assembly 100 is finally attached to the primary portion of a set-top box. FIG. 2 illustrates that pushbuttons 106 may be located at various locations on the exterior surface 114 and that LEDs 108 may similarly be located at various locations on the exterior surface 114. Further, it will be appreciated that LEDs 108 may be integrally associated with pushbuttons 106 such that a LED 108' is carried by a pushbutton 106'. Still further, pushbuttons 106 and LEDs 108 may be distributed in various formations such as a radial array 116. Infrared receivers are well known as receivers of remote commands and the infrared receiver 110 is of the known type and is located on the exterior surface 114 in a manner so that it may receive remotely generated commands from an infrared remote controller during use of the front panel assembly 100 when the front panel assembly 100 is finally attached to the primary portion of a set-top box.

Figure 3:
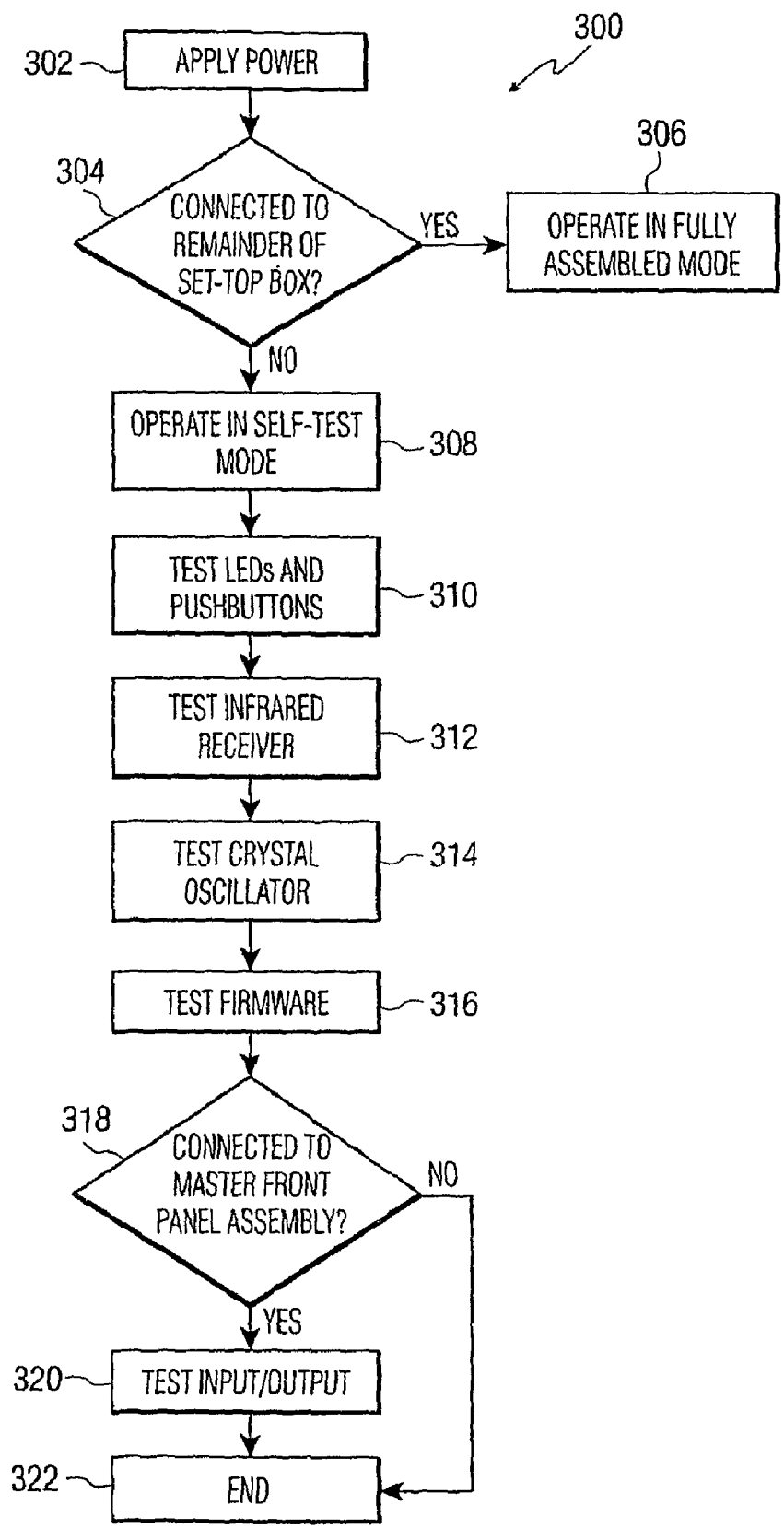
FIG. 3 is a flowchart diagram of an operation sequence of the front panel assembly of FIG. 1.

Referring now to FIG. 3 in the drawings, a flowchart of an operation sequence of the front panel assembly 100 is illustrated. Front panel assembly 100 generally operates as shown in operation sequence 300. At a first action 302 of sequence 300, power is applied to front panel assembly 100. Once power is applied, at decision 304, the microcontroller 102 determines whether the front panel assembly 100 is connected to the primary portion of a set-top box. If the answer is Yes, and the front panel assembly 100 is connected to the primary portion of a set-top box, at action 306, the microcontroller 102 proceeds to operate in the fully-assembled mode (as described above). If the answer is No, and the front panel assembly 100 is not connected to the primary portion of a set-top box, at action 308, the microcontroller 102 proceeds to operate in the self-test mode and then begins a series of self-test procedures. At action 310, the pushbuttons 106 and LEDs 108 are tested. Next, at action 312, the infrared receiver 110 is tested. Next, at action 314, the crystal oscillator 104 is tested. Next, at action 316, the firmware (carried by the memory of the microcontroller 102) is tested. Next, at decision 318, the front panel assembly 100 determines whether the front panel assembly 100 is connected to another front panel assembly (which serves as a Master for testing purposes). If the answer is Yes, and the front panel assembly 100 is connected to another front panel assembly, at action 320, the inter-integrated circuit is tested. After testing the inter-integrated circuit, the sequence ends at action 322. If the answer at decision 318 is No, and the front panel assembly 100 is not connected to another front panel assembly, the sequence ends at action 322.

Now, each step of the above sequence will be described in detail. With regard to the application of power at action 302, power is applied to the front panel assembly 100 through the electrical connection interface 112 (the ribbon cable) from a source other than the primary portion of a set-top box to enter the self-test mode at action 308. The microcontroller 102 memory contains the necessary software (firmware) to perform the testing procedures.

With regard to the decision 304, the microcontroller 102 uses the pull-up resistors as described previously to determine whether the front panel assembly 100 is connected to the primary portion of a set-top box.

With regard to testing the LEDs 108 and pushbuttons 106 at action 310, front panel assembly 100 is configured to accomplish this in an efficient manner. Specifically, when two specified pushbuttons 106 are pressed, the microcontroller 102 illuminates all LEDs 108 for a quick visual inspection. The quick visual inspection allows an inspector to determine which, if any, of the LEDs 108 are not functional or do not emit the correct color or intensity. With regard to testing the pushbuttons 106, the pushbuttons 106 are tested by the microcontroller 102 first illuminating twelve LEDs 108 (the twelve LEDs 108 of the radial array 116) and associating a specific LED 108 to each of the twelve pushbuttons 106 such that when a pushbutton 106 is pressed, the associated LED 108 is turned off. By testing the pushbuttons 106 and LEDs 108 in the above-described manner, the connectivity between the microcontroller 102 and the pushbuttons 106 and LEDs 108 is inherently checked.

With regard to testing the infrared receiver 110 at action 312, an infrared generator or an infrared remote controller is used to generate infrared pulses to be received by the infrared receiver 110. The microcontroller 102 tests the infrared receiver 110 by receiving the infrared transmission from the infrared receiver 110, detecting a transition of logic state from high to low, and correspondingly momentarily illuminating the twelve LEDs 108 of the radial array 116.

With regard to testing the crystal oscillator 104 at action 314, the microcontroller 102 compares the frequency of its internal oscillation to the frequency of a separate externally applied oscillation. This testing can be accomplished in a number of ways, but in the present embodiment, a control frequency (which is set to be close in value to the proper internal oscillation of the microcontroller 102) is supplied to the microcontroller 102 through the electrical connection interface 112. While the control frequency is supplied to the microcontroller 102, the microcontroller 102 compares the control frequency to the internal oscillation of the microcontroller 102 using an internal counter. If the frequencies of the control frequency and internal oscillation are close in value (indicating that both the microcontroller 102 and the crystal oscillator 104 are properly functioning), the microcontroller 102 turns on all of the LEDs 108. It will be appreciated that in alternative embodiments where a microcontroller comprises and operates in conjunction only with an oscillator or resonator internal to the microcontroller, this action may be replaced by simply comparing the internal oscillation of the microcontroller to an externally supplied oscillation (as described above), but without regard to the source of oscillation. It will be appreciated that by testing the internal oscillation of the microcontroller, the source of the internal microcontroller oscillation is inherently tested.

With regard to testing the software (the firmware) stored in the microcontroller 102 memory at action 316, when two specific pushbuttons 106 are pressed, the microcontroller performs a checksum on the firmware in the firmware memory space. The microcontroller 102 then illuminates LEDs 108 to indicate the binary representation of the checksum for comparison with the expected result. An operator can verify which LEDs 108 are illuminated and determine which software version is programmed into the microcontroller 102 by comparing the binary representation to a binary number in a test document. The same checksum process also verifies the integrity of the firmware. The binary representation of the firmware version is also illuminated via the LEDs 108. At decision 318, if the front panel assembly 100 being tested is not connected to another front panel assembly, the sequence 300 ends at action 322. At decision 318, if the front panel assembly 100 being tested is connected to another front panel assembly, the input/output interface of the microcontroller 102 is tested. It will be appreciated that sequence 300 is only one example of myriad of possible sequences for testing the front panel assembly 100 (and other device components). For example, in alternative embodiments of the present invention, the sequence may perform several test procedures simultaneously, may allow user input for determining which test procedures to perform, and may allow a user to control what order to perform test procedures.

With regard to testing the input/output interface of the microcontroller 102 (the inter-integrated circuit ($I^2C$)) at action 320, the front panel assembly 100 being tested acts as a Slave while the other connected front panel assembly acts as a Master. The Slave/Master determination is inherent to the inter-integrated circuit protocol since the device which initiates data transfer is considered the Master (at least until the communication is complete). Accordingly, since the front panel assembly connected to the front panel assembly 100 being tested initiates the data transfer, it is considered the Master. During this testing procedure, the ribbon cable delivers power to both the Slave front panel assembly 100 (the front panel assembly 100 being tested) and the Master front panel assembly. The inter-integrated communication functionality is tested by: pressing a particular pushbutton on the Master front panel assembly, the microcontroller of the Master front panel assembly communicating that event (the pushbutton of the Master front panel assembly being pressed) to the Slave front panel assembly 100 microcontroller 102, the microcontroller 102 of the Slave front panel assembly 100 receiving notification that the pushbutton of the Master front panel assembly has been pressed, and the microcontroller 102 of the Slave front panel assembly 100 subsequently illuminating a particular LED 108 to indicate successful communication of the event. After testing the inter-integrated communication functionality, the sequence 300 ends at action 322. It will be appreciated that in an alternative embodiment, during the connection of the Master front panel assembly to the Slave front panel assembly 100, the crystal oscillator 104 and the microcontroller 102 can be tested (similar to the crystal oscillator test describe previously) by comparing the internal oscillation of the microcontroller of the Master front panel assembly to the internal oscillation of microcontroller 102 of the Slave front panel assembly 100.

An aspect of the invention includes the method of testing a device component (e.g., the front panel assembly of set-top box). It involves detecting whether the device component is connected to a primary portion (e.g., main processor) of the device and operating a microcontroller of the device component in a self-test mode if the device component is not connected to the primary portion of the device.

In sum, a set-top box can have a main processor connected to a front panel assembly, wherein the front panel assembly has a microcontroller that is adapted to receive and store software instructions for performing self-tests. The front panel assembly can be adapted to electronically disconnect from main processor when external power is applied and can be adapted to operate in a self-test mode when the external power is applied (e.g. through a ribbon cable port on the front panel assembly).

It will be appreciated that alternative embodiments of the present invention may take the form of any device or component of a device comprising a microcontroller, and that the present invention is not limited to the front panel assembly described above.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A front panel assembly for a set-top box, the front panel assembly comprising:
a microcontroller;
wherein the microcontroller is configured to operate in a fully-assembled mode if the front panel assembly is connected to a primary portion of the set-top box when power is applied to the front panel assembly;
wherein the microcontroller is configured to operate in a self-test mode if the front panel assembly is not connected to the primary portion of the set-top box when power is applied to the front panel assembly; and
a pull-down and/or pull-up resistor associated with the microcontroller for determining whether the front panel assembly is connected to the primary portion of the set-top box.

2. The front panel assembly according to claim 1, further comprising:
a plurality of light emitting diodes; and
software stored in a microcontroller memory space;
wherein the microcontroller tests the software during operation of the microcontroller in the self-test mode by performing a checksum on the microcontroller memory space and by selectively illuminating the plurality of light emitting diodes in response to the results of the checksum.

3. The front panel assembly according to claim 2, wherein the microcontroller selectively illuminates the plurality of light emitting diodes to display a binary representation of a checksum value.

4. The front panel assembly according to claim 2, wherein the microcontroller selectively illuminates the plurality of light emitting diodes to display a binary representation of a software version.

5. The front panel assembly according to claim 1, further comprising:
a light emitting diode;
an input/output interface; and
wherein the microcontroller tests the input/output interface during operation of the microcontroller in the self-test mode and while the front panel assembly is connected to a second front panel assembly by selectively illuminating the light emitting diode in response to a pushbutton of the second front panel assembly being pressed.

6. The front panel assembly according to claim 5, wherein the input/output interface comprises an inter-integrated circuit.

7. The front panel assembly according to claim 1, further comprising:
a radial array of light emitting diodes.

8. The front panel assembly according to claim 7, wherein the radial array comprises twelve light emitting diodes.

9. The front panel assembly according to claim 1, further comprising:
a light emitting diode; and
a pushbutton;
wherein the microcontroller tests the light emitting diode during operation of the microcontroller in the self-test mode by selectively illuminating the light emitting diode.

10. The front panel assembly according to claim 1, further comprising:
a light emitting diode; and
a pushbutton;
wherein the microcontroller tests the pushbutton during operation of the microcontroller in the self-test mode by selectively illuminating the light emitting diode in response to the pushbutton being pressed.

11. The front panel assembly according to claim 1, further comprising:
a light emitting diode; and
a pushbutton;
wherein the microcontroller tests the pushbutton during operation of the microcontroller in the self-test mode by selectively turning off the light emitting diode in response to the pushbutton being pressed.

12. The front panel assembly according to claim 1, further comprising:
a light emitting diode; and
an infrared receiver;
wherein the microcontroller tests the infrared receiver during operation of the microcontroller in the self-test mode by selectively illuminating the light emitting diode in response to the infrared receiver receiving an infrared transmission.

13. The front panel assembly according to claim 1, further comprising:
a light emitting diode; and
a crystal oscillator operably associated with the microcontroller;
wherein the microcontroller tests the crystal oscillator by comparing a frequency of an internal oscillation of the microcontroller during operation of the microcontroller in the self-test mode to a frequency of an externally supplied oscillation and by selectively illuminating the light emitting diode if the frequencies are close in value.

14. The front panel assembly according to claim 1, wherein the front panel assembly is adaptable to receive power via a ribbon cable.

15. A method of testing a device component, comprising the steps of:
detecting whether the device component is connected to a primary portion of the device;
operating a microcontroller of the device component in a self-test mode if the device component is not connected to the primary portion of the device; and
wherein the device component comprises a pull-down and/or pull-up resistor for use in detecting whether the device component is connected to the primary portion of the device.

16. The method according to claim 15, wherein the primary portion of the device comprises a main processor.

17. A device component of a device, the device component comprising:
a microcontroller;
wherein the microcontroller is configured to operate in a fully-assembled mode if the device component is connected to a primary portion of the device when power is applied to the device component;
wherein the microcontroller is configured to operate in a self-test mode if the device component is not connected to the primary portion of the device when power is applied to the device component; and wherein the device component comprises a pull-down and/or pull-up resistor for use in detecting whether the device component is connected to the primary portion of the device.

18. A set-top box comprising a main processor connected to a front panel assembly, wherein the front panel assembly has a microcontroller, the microcontroller being adapted to receive and store software instructions for performing self-test; the front panel assembly is adapted to electronically disconnect from the main processor when external power is applied and is adapted to operate in a self-test mode when the external power is applied; and a pull-down and/or pull-up resistor associated with the microcontroller for determining whether the front panel assembly is connected to a primary portion of the set-top box.

* * * * *